US008976375B2

(12) United States Patent
Yoshida et al.

(10) Patent No.: US 8,976,375 B2
(45) Date of Patent: Mar. 10, 2015

(54) IMAGE FORMING APPARATUS AND COMPUTER-READABLE STORAGE MEDIUM CONTAINING A COMPUTER PROGRAM FOR LIMITING TEXT ENTRY AND SELECTION

(75) Inventors: Okihisa Yoshida, Kawanishi (JP); Masakazu Murakami, Takarazuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 61 days.

(21) Appl. No.: 13/446,157

(22) Filed: Apr. 13, 2012

(65) Prior Publication Data
US 2012/0274965 A1 Nov. 1, 2012

(30) Foreign Application Priority Data

Apr. 26, 2011 (JP) ................................. 2011-097823

(51) Int. Cl.
*G06K 15/02* (2006.01)
*H04N 1/00* (2006.01)
*H04N 1/32* (2006.01)

(52) U.S. Cl.
CPC ....... *H04N 1/00384* (2013.01); *H04N 1/00395* (2013.01); *H04N 1/00411* (2013.01);
(Continued)

(58) Field of Classification Search
USPC ........................ 358/1.13; 715/205, 501.1, 764
See application file for complete search history.

(56) References Cited

U.S. PATENT DOCUMENTS

2006/0129912 A1* 6/2006 Kunori ........................ 715/501.1
2006/0239245 A1* 10/2006 Van Hoof ........................ 370/352
(Continued)

FOREIGN PATENT DOCUMENTS

JP  2005-011146 A    1/2005
JP  2005011146 A  *  1/2005  .............. G06F 17/21
(Continued)

OTHER PUBLICATIONS

Office Action (Notification of Reason(s) for Refusal) issued on Jul. 2, 2013, by the Japanese Patent Office in corresponding Japanese Patent Application No. 2011-097823, and an English Translation of the Office Action. (7 pages).

(Continued)

*Primary Examiner* — Houshang Safaipour
*Assistant Examiner* — Edwin S Leland, III
(74) *Attorney, Agent, or Firm* — Buchanan Ingersoll & Rooney PC

(57) ABSTRACT

An image forming apparatus is provided which has an operating panel capable of providing a screen display and a Web browser. The image forming apparatus includes a storage for storing predetermined text that is data to be entered into a text entry box of a Web page; a text entry limiting portion for, when the Web page displayed on the operating panel by the Web browser contains the text entry box, limiting text to be entered into the text entry box to the predetermined text stored in the storage; a display processing portion for, when the text entry limiting portion limits text to be entered, displaying, on the operating panel, a screen for a user to designate the predetermined text as text to be entered into the text entry box; and an operation processing portion for informing the Web browser of the predetermined text designated by the user.

6 Claims, 12 Drawing Sheets

(52) U.S. Cl.
CPC ....... *H04N1/00424* (2013.01); *H04N 1/00435* (2013.01); *H04N 1/00437* (2013.01); *H04N 1/00464* (2013.01); *H04N 1/00503* (2013.01); *H04N 1/32037* (2013.01); *H04N 1/32683* (2013.01); *H04N 1/00204* (2013.01); *H04N 1/00244* (2013.01); *H04N 2201/0039* (2013.01); *H04N 2201/0094* (2013.01)
USPC .. 358/1.13; 358/1.15; 707/769; 707/E17.014; 715/501.1; 370/352

(56) References Cited

U.S. PATENT DOCUMENTS

| | | | | |
|---|---|---|---|---|
| 2007/0256003 | A1* | 11/2007 | Wagoner et al. | 715/501.1 |
| 2008/0150952 | A1* | 6/2008 | Koarai | 345/531 |
| 2009/0164927 | A1* | 6/2009 | Nakahara | 715/764 |
| 2009/0234876 | A1* | 9/2009 | Schigel et al. | 707/102 |
| 2010/0057739 | A1* | 3/2010 | Charka et al. | 707/7 |
| 2010/0123927 | A1* | 5/2010 | Hirose | 358/1.15 |
| 2010/0325147 | A1* | 12/2010 | Shogaki | 707/769 |

FOREIGN PATENT DOCUMENTS

| | | | | | |
|---|---|---|---|---|---|
| JP | 2006-192878 | A | | 7/2006 | |
| JP | 2006-246190 | A | | 9/2006 | |
| JP | 2006246190 | A | * | 9/2006 | .............. H04N 1/00 |
| JP | 2008-139981 | A | | 6/2008 | |
| JP | 2008-199151 | A | | 8/2008 | |
| JP | 2008199151 | A | * | 8/2008 | .............. H04N 1/00 |
| JP | 2009-152847 | A | | 7/2009 | |
| JP | 2010-122810 | A | | 6/2010 | |
| JP | 2010-277120 | A | | 12/2010 | |
| JP | 2010277120 | A | * | 12/2010 | .............. G06F 13/00 |
| JP | 2011-002961 | A | | 1/2011 | |

OTHER PUBLICATIONS

Decision of Refusal dated Mar. 4, 2014 issued in the corresponding Japanese Patent Application No. 2011-097823 and English language translation (5 pages).

* cited by examiner

IMAGE FORMING APPARATUS AND COMPUTER-READABLE STORAGE MEDIUM CONTAINING A COMPUTER PROGRAM FOR LIMITING TEXT ENTRY AND SELECTION

This application is based on Japanese patent application No. 2011-097823 filed on Apr. 26, 2011, the contents of which are hereby incorporated by reference.

BACKGROUND OF THE INVENTION

1. Field of the Invention

The present invention relates to an image forming apparatus implementing a Web browser, and a computer-readable storage medium for computer program executed in such an image forming apparatus. An example of the image forming apparatus is an information device called a Multi-Functional Peripheral (MFP).

2. Description of the Related Art

There is known an image forming apparatus which has a Web browser for displaying Web pages publicized on the Internet or an intranet. An MFP is proposed which displays a virtual keyboard on an operating panel, obtains, from a Web site, a Web page corresponding to a Uniform Resource Locator (URL) entered through the virtual keyboard by a user, and displays the Web page obtained on the operating panel (Japanese Laid-open Patent Publication No. 2008-199151). According to such an image forming apparatus, a user is able to browse any Web page (perform browsing) without using a personal computer or another information device.

Some Web pages on the Internet contain a text entry box for a viewer to enter any character string. For example, a Web page for questionnaire contains a section (input field) into which opinions and feedback are entered. A Web page for sign-up contains a section into which personal information is entered. According to an image forming apparatus described in Japanese Laid-open Patent Publication No. 2010-277120, when a form, of a Web page, described in a Hypertext Markup Language (HTML) contains a tag (<input type="text">) for designating creation of a single-line text entry box, the Web page is displayed to contain a button for a user to invoke a virtual keyboard. When the user operates the button to display the virtual keyboard and enter any character string, the character string is sent from the image forming apparatus to a server from which the Web page is sent.

In recent years, more and more information devices have implemented a user interface by using a display function of a Web browser. An image forming apparatus is one of such devices. A multifunctional apparatus disclosed in Japanese Laid-open Patent Publication No. 2008-139981 obtains operating screen data from an external controller by using a Hypertext Transfer Protocol (HTTP), and displays an operating screen based on the operating screen data on an operating panel by a Web browser. Japanese Laid-open Patent Publication No. 2009-152847 shows, in FIG. 27, a screen having a field in which a file path is typed in uploading a file of an HTML form from an MFP to a server.

In the meantime, there has been a technology for prohibiting any character or character string from being entered on an operating panel, i.e., a technology for prohibiting direct entry. For example, as for an image forming apparatus having a facsimile function described in Japanese Laid-open Patent Publication No. 2006-246190, when being set to a mode in which entering a telephone number through a numerical keypad is prohibited, the image forming apparatus refuses to accept a telephone number entered via the numerical keypad. This arrangement prevents a facsimile document from being transmitted to an unintended recipient because of erroneous operation of the numerical keypad made by an operator.

A Web browser of an image forming apparatus displays any Web page obtained from a Web server provided in the image forming apparatus itself or in an external device connected to the image forming apparatus via a network. When the Web page has a text entry box, the Web browser sends, to the Web server, any text entered by a user of the image forming apparatus. The Web browser sends entered text to the Web server also when the Web page is an operating screen using a Web browser in a Web-based user interface. Thus, if a user enters incorrect text as a transmission destination, for example, an incorrect job may be sent to the image forming apparatus and the incorrect job may be executed.

If the type of information to be entered into a text entry box can be determined based on the form of a Web page, then it may be possible to prohibit a predetermined type of text such as telephone number or electronic mail address from being directly entered. However, a creator of a Web application providing a user interface does not always create a form in such a manner that the type of text can be discerned.

The present disclosure is directed to solve the problems pointed out above, and therefore, an object of an embodiment of the present invention is to prevent text from being entered incorrectly when a Web browser is used as a user interface.

SUMMARY

An image forming apparatus according to one aspect of the present invention is an image forming apparatus having an operating panel capable of providing a screen display and a Web browser. The image forming apparatus includes a storage portion configured to store predetermined text that is data to be entered into a text entry box of a Web page; a text entry limiting portion configured to, when the Web page displayed on the operating panel by the Web browser contains the text entry box, limit text to be entered into the text entry box to the predetermined text stored in the storage portion; a display processing portion configured to, when the text entry limiting portion limits text to be entered, display a screen on the operating panel, the screen being used for a user to designate the predetermined text as text to be entered into the text entry box; and an operation processing portion configured to inform the Web browser of the predetermined text designated by the user.

These and other characteristics and objects of the present invention will become more apparent by the following descriptions of preferred embodiments with reference to drawings.

DESCRIPTION OF THE PREFERRED EMBODIMENTS

Descriptions are provided below by taking a Multi-Functional Peripheral (MFP) as an example of an image forming apparatus having a Web browser for displaying Web pages. The MFP is an information device having a plurality of functions such as image input (scanning), facsimile communication, e-mail message communication, and document saving, in addition to copying and network printing both of which are functions as the image forming apparatus.

[Configuration of Information System Involving MFP]

Figure 1:
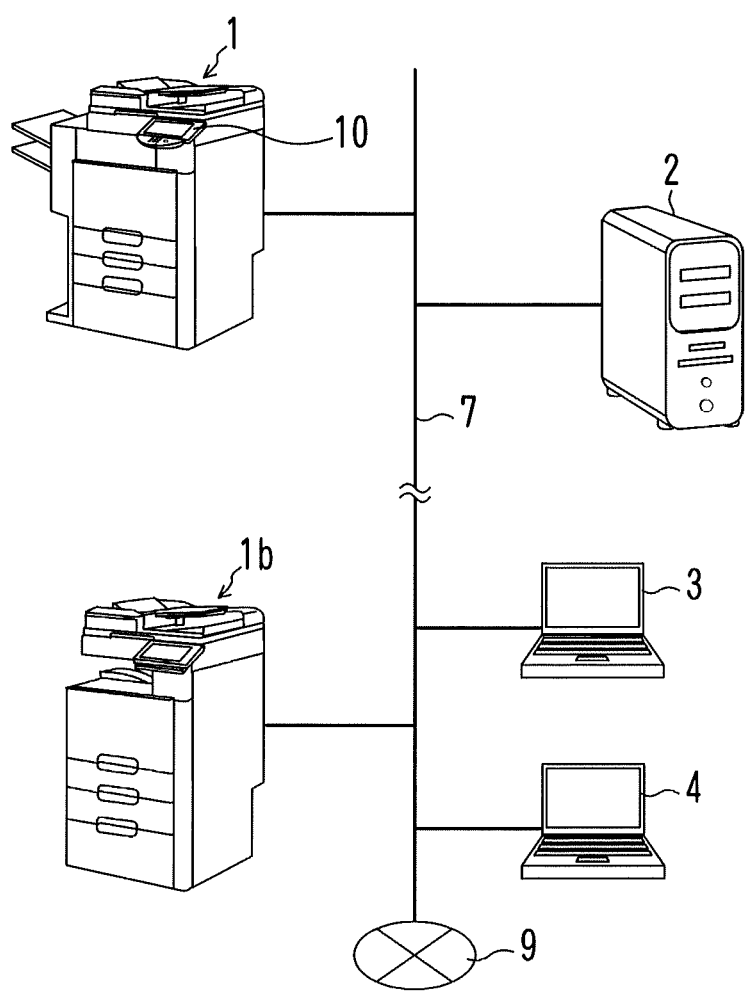
FIG. 1 is a diagram showing an example of the configuration of an information processing system according to an embodiment of the present invention.

An MFP 1 shown in FIG. 1 is connected to an application server 2 via a network 7 connected to the Internet 9. The network 7 is, for example, a Local Area Network (LAN) installed on an office of business. The network 7 may be any one of a wired network, a wireless network, and a network provided by combining a wired network and a wireless network. In addition to the MFP 1 and the application server 2, information devices such as personal computers 3 and 4 serving as clients using functions of the MFP 1 and MFP 1b are connected to the network 7 so as to perform communication with the MFP 1.

The application server 2 may be a server machine, an ordinary personal computer, or the MFP 1b, provided that it can execute a computer program for implementing the functions of a Web server. The functions of a Web server are not necessarily provided in a device that is external to the MFP 1. A Web server can be operated within the MFP 1.

A user of the MFP 1 performs direct operation by using an operating panel 10 provided on the front of the upper part of a casing of the MFP 1. Through such operation, the user can cause the MFP 1 to perform desired operation or can use applications of the application server 2. The Web browser on the MFP 1 is used as a user interface for operation through the operating panel 10. The Web browser performs communication with a Web server operating on the application server 2, obtains a Web page for operation from the Web server, and displays the obtained Web page on the operating panel 10. The operation details with the Web page displayed are conveyed to the Web server via the Web browser. The Web server or a Web application cooperating therewith gives a job depending on the operation details to the MFP 1.

[Outline of the Entire Configuration of MFP]

Figure 2:
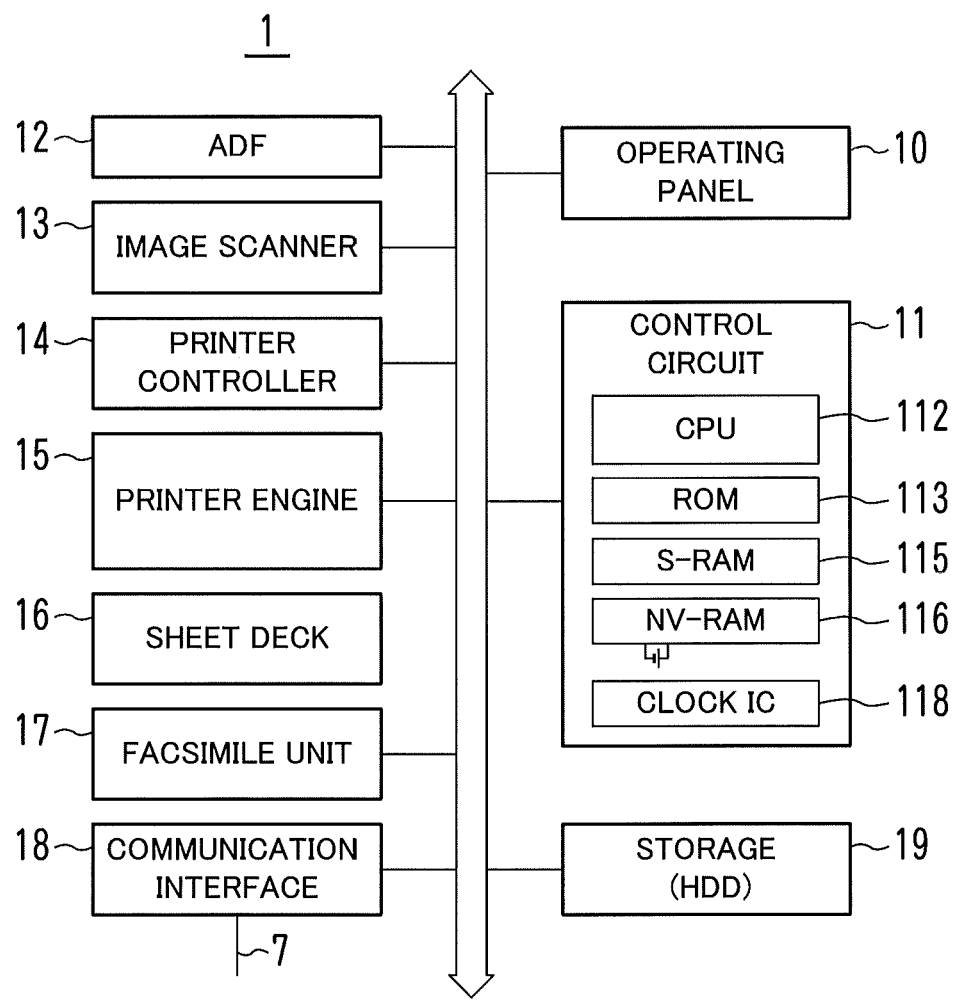
FIG. 2 is a diagram showing an example of the hardware configuration of an MFP.

FIG. 2 is a block diagram showing an outline of the hardware configuration of the MFP 1.

A control circuit 11 serving to control an overall operation of the MFP 1 is configured of a Central Processing Unit (CPU) 112 functioning as a computer to execute a control program and a variety of applications, a Read Only Memory (ROM) 113 for storing the control program, a Static Random Access Memory (S-RAM) 115 which is a work area for program execution, a battery-packed Non-Volatile memory (NV-RAM) 116 for storing setting values for operation, an integrated circuit 118 (clock IC) for counting the system time, and so on. An Automatic Document Feeder (ADF) 12 is provided with a document tray. For copying, image input, or facsimile transmission, the ADF 12 feeds a document sheet placed on the document tray to a scan position by an image scanner 13. The image scanner 13 serves to optically read out image information recorded on the document sheet. A printer controller 14 performs data processing for printing, such as mapping print data received from an external device in a bitmap form. A printer engine 15 is operable to print a monochrome or color image on a single side or both sides of paper supplied from a multi-stage sheet deck 16. A facsimile unit 17 performs data processing for facsimile transmission/reception using a non-illustrated telephone line or the network 7. A communication interface 18 connects the MFP 1 to the network 7, and thereby LAN communication between the MFP 1 and external devices and facsimile communication therebetween are made possible. The storage 19 is a mass storage device such as a hard disk drive (HDD). The storage 19 is provided with a memory area in which the control program and control data including screen data for display of operation screens are stored, and also provided with a memory area (so-called box) in which a variety of document files are saved. Further, predetermined text DT described below and programs for implementing the Web browser are stored into the storage 19, and are loaded into the work area if required.

[Configuration of Operating Panel of MFP]

Figure 3:
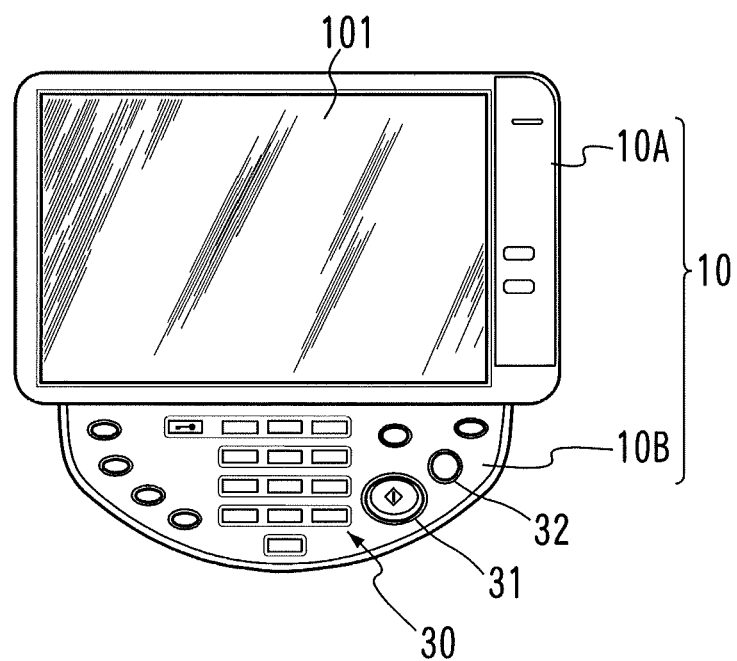
FIG. 3 is a diagram showing an example of the configuration of an operating panel of an MFP acting as an image forming apparatus.

As shown in FIG. 3, the operating panel 10 of the MFP 1 is configured of a touch-sensitive panel portion 10A capable of displaying any screen such as a Web page, and a keypad panel portion 10B having fixed-keys. A touchscreen 101 placed on the touch-sensitive panel portion 10A is provided with a display 102 for displaying screens and a translucent touch-sensitive input device 103 provided to make intimate contact with the face of the display (see FIG. 4). The front face of the touchscreen 101 serves as a screen and also as a touch operation surface. The fixed-keys of the keypad panel portion 10B are, for example, a group of numeric input keys (numeric keypad) 30, a start key 31 for starting job execution, a stop key 32 for canceling job execution, and so on.

Since the illustrated operating panel 10 is not provided with an actual keyboard, a virtual keyboard displayed on the touchscreen 101 is used for text input. However, another arrangement is possible in which text input using an actual keyboard is implemented by, for example, providing a slide-out keyboard, which is drawn out from a storage position when necessary, in the operating panel 10, or, by providing a connector to which a USB keyboard is connected.

[Functional Configuration of MFP]

Figure 4:
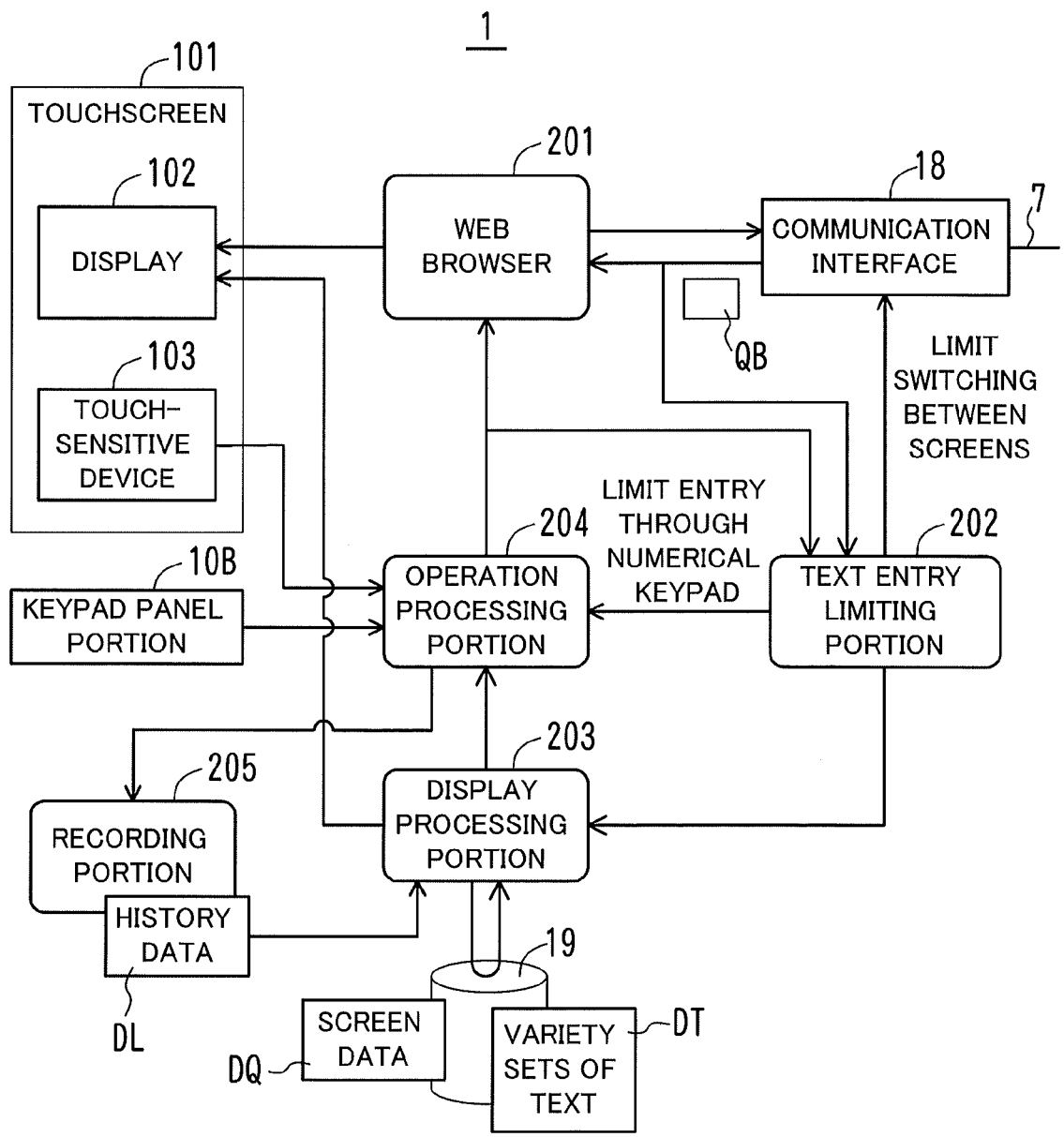
FIG. 4 is a block diagram showing an example of the functional configuration related to a user interface of an MFP.

Referring to FIG. 4, the MFP 1 is configured of a Web browser 201, a text entry limiting portion 202, a display processing portion 203, an operation processing portion 204, a recording portion 205, and so on. These portions are functional elements implemented when the CPU 112 of the control circuit 11 executes a predetermined computer program related to user interface. Thanks to the functional elements of the MFP 1, even when a Web-based user interface is used, the MFP 1 can be adapted for the following security policy: "In the case of normal use by an ordinary user who is not an administrator, direct text entry is prohibited".

The Web browser 201 performs communication with a Web server through the communication interface 18, and obtains, from the Web server, a Web page QB whose structure is described in a predetermined markup language (HTML, XML, XTML, or WML, for example). The Web browser 201 then displays the Web page QB obtained on a display 102 of the touchscreen 101. Hereinafter, making indication on the display 102 is sometimes referred to "displaying" for the sake of convenience.

In a state where the Web page QB is displayed, an operation processing portion 204 informs the Web browser 201 of the details of operation made on the touchscreen 101 or the keypad panel portion 10B by a user. The Web browser 201 requests, when necessary, the Web server to perform process depending on the operation. For example, when the user performs instruction operation for switching between pages, the Web browser 201 requests the Web server to transfer a Web page to be newly displayed, and displays the Web page sent from the Web server. When a Web page QB currently displayed has a field in which information entered by a user is accepted, for example, an input element of an HTML form, then the Web browser 201 sends the information entered intentionally by the user to the Web server. The information entered by the user is not only information represented by characters but also information indicating user's intention, e.g., whether or not to place a check mark, and which option is to be selected.

In the case where a Web page QB displayed on the touchscreen 101 by the Web browser 201 has a text entry box, the text entry limiting portion 202 limits text entered into the text entry box to predetermined text that is already held in the MFP 1. Stated differently, the text entry limiting portion 202 prohibits a user from directly entering any text. In principle, every part where the user is required to enter any text consisting of at least one letter is handled as a text entry box to which the entry limitation applies. The entry limitation is applied to: a single-line text field to be filled with an input element whose type attribute is "text"; and a multi-line text field to be filled with a text area element.

As processing of limiting any text input, for example, the text entry limiting portion 202 forces the communication interface 18 to stop transmission from the Web browser 201 to the Web server. Thereby, switching to a page displaying a virtual keyboard is stopped, and, even if a Web page QB currently displayed contains a virtual keyboard, the virtual keyboard does not respond to user operation. It is also possible to directly instruct the Web browser 201 to stop transmission to the Web server.

As processing of limiting any text input, the text entry limiting portion 202 instructs the operation processing portion 204 to refuse to accept numerical values entered through the numerical keypad of the keypad panel portion 10B. Note, however, that, if the user selects predetermined text to be entered into a text entry box by entering a numerical value, the text entry limiting portion 202 preferably does not give the foregoing instructions to the operation processing portion 204.

The display processing portion 203 provides a user interface for a user to designate predetermined text to be entered into a text entry box. To be specific, when the text entry limiting portion 202 limits text input, the display processing portion 203 takes the place of the Web browser 201 to control the display 102, and displays a screen for operation of designating predetermined text. In this instance, the display processing portion 203 uses a screen form indicated in screen data DQ stored in advance, and incorporates, into a screen, a plurality of sets of predetermined text DT extracted before displaying the screen as available choices by the user.

In order to extract predetermined text DT, the display processing portion 203 searches a data storage area of the MFP 1 as a storage unit represented by the storage 19 and the NV-RAM 116. The predetermined text DT extracted by the display processing portion 203 is, for example, address information (electronic mail address, party at the other end of communication through File Transfer Protocol (FTP) or Server Message Block (SMB), party at the other end of facsimile communication, and so on), box-related information (box name, box number, name of document saved in box, representative word/phrase in document such as PDF where text search is possible), fixed character string (Prefix/Suffix). In short, the predetermined text DT extracted by the display processing portion 203 is text that is assumed to be probably entered by a user. In the MFP 1 of this example, predetermined text whose type (category) is set by an administrator is excluded from the extraction target. This is to prevent a user who is not an administrator from inadvertently entering text that is permitted to be entered only by the administrator. When the need arises, the administrator may set a mode in which text entry limitation is cancelled tentatively. In doing so, the administrator may display a Web page for administrator in the Web browser 201, and enter text that is permitted to be entered only by the administrator.

The operation processing portion 204 informs the Web browser 201 of one set of predetermined text (any of the predetermined text DT) designated by the user in a state where the display processing portion 203 displays a screen. In response to the process by the operation processing portion 204, the text entry limiting portion 202 cancels text entry limitation. Further, the Web browser 201 displays a Web page in which the predetermined text informed by the operation processing portion 204 is entered in a text entry box.

If the Web page QB has another text entry box that is left blank aside from the text entry box where the predetermined text has been entered, and, if an operation event for designating the former text entry box occurs, then text entry is limited again, and a screen for designating predetermined text is displayed instead of the Web page QB, or, the screen and the Web page QB are displayed partially one above the other. At this time, if predetermined text DT extracted most recently still remains in the work area, then the predetermined text DT in the work area can be used for screen display without searching the data storage area.

The recording portion 205 makes a record of history data DL that identifies the Web page QB displayed by the Web browser 201 and indicates the type of the predetermined text designated in the Web page QB by the user. If the Web page QB displayed by the Web browser 201 is a Web page which is displayed before and whose history data DL is already recorded, then the display processing portion 203 presents predetermined text to the user in such a manner that predetermined text corresponding to the type indicated in the history data DL takes precedence over predetermined text of the other types. This enables the user to enter desired text into a text entry box speedily.

[User Interface for Text Entry]

Figure 5:
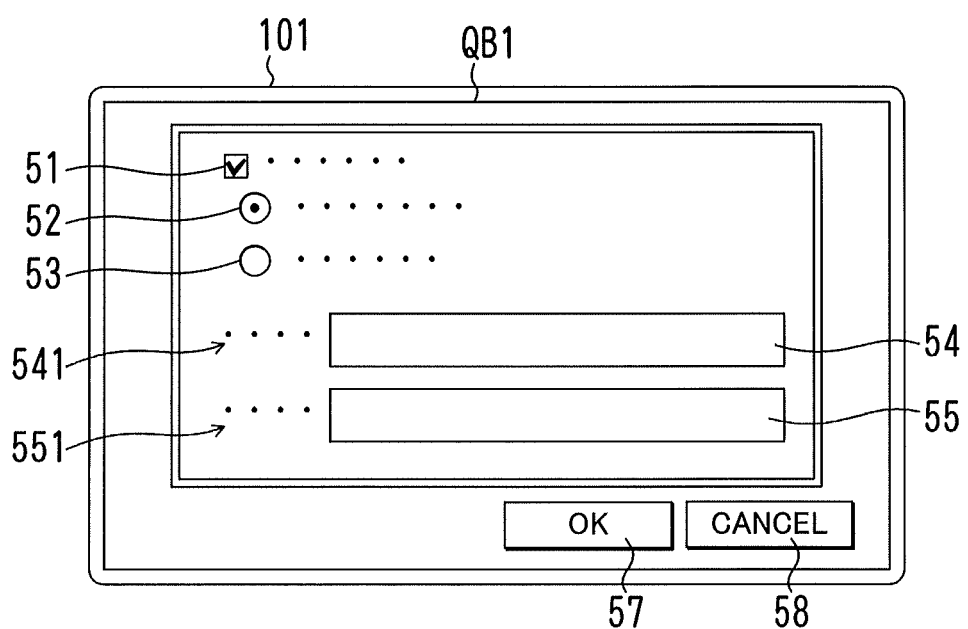
FIG. 5 is a diagram showing an example of a Web page displayed by a Web browser and having a text entry box.

FIG. 5 shows a Web page QB1 displayed on the touchscreen 101 by the Web browser 201. The illustrated Web page QB1 serves as an operating screen for a user to designate desired operation settings. The Web page QB1 has a check box 51, radio buttons 52 and 53, two text entry boxes 54 and 55 that are text entry fields, send buttons (input elements whose type attribute is "submit" each) 57 and 58, and so on. Character strings 541 and 551 indicating text types are provided adjacent to the text entry boxes 54 and 55, which allow the user to know the type of text to be entered. When the user enters predefined text into the individual text entry boxes 54 and 55, and presses the send button 57 denoted by the term "OK", the text entered is sent to the Web server together with data indicating the operation statuses of the check box 51 and the radio buttons 52 and 53. When the user presses the send button 58 denoted by the term "cancel" as the need arises, the Web server is informed of the fact and the current indication made on the touchscreen 101 is changed to another Web page.

In the case where direct text entry is not prohibited, and where the user attempts to enter text into any one of the text entry boxes 54 and 55 (for example, where the user presses one of the text entry boxes into which text is to be entered), the Web browser 201 and the Web server cooperate with each other to display a virtual keyboard which enables the user to enter any text. In contrast, in the case of a mode where direct text entry is prohibited, entering text is prohibited as discussed earlier, and screens for entering predetermined text are displayed as shown in FIGS. 6 through 9.

Figure 6:
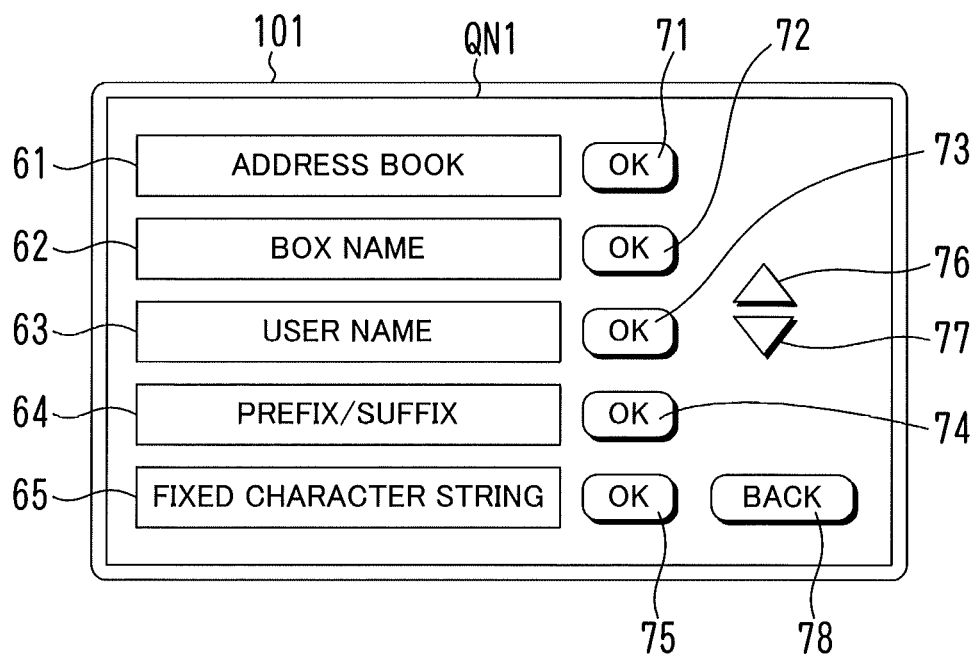
FIG. 6 is a diagram showing an example of a text type selection screen for text entry displayed when entering text into a text entry box of a Web page is limited.

Referring to FIG. 6, the display processing portion 203 displays a text type selection screen QN1 on the touchscreen 101. The illustrated text type selection screen QN1 has five options 61, 62, 63, 64, and 65 indicating, in characters, types of predetermined text which are candidates for being entered into the text entry boxes, five choice buttons 71, 72, 73, 74, and 75 corresponding to the options 61, 62, 63, 64, and 65 respectively, shift buttons 76 and 77 for changing options to be displayed, and an entry stop button 78 for changing the current indication on the touchscreen 101 to the indication of a Web page by the Web browser 201. The options 61 through 65 are "address book", "box name", "user name", "Prefix/Suffix", and "fixed character string" respectively in the illustrated example. When the user selects one of the choice buttons 71 through 75 corresponding to a type of predetermined text that the user intends to enter, a text selection screen is displayed on which the user selects one from among choices of the corresponding predetermined text. For example, when the user presses the choice button 71 corresponding to the option 61 ("address book"), a text selection screen QN2 is displayed as shown in FIG. 7.

Figure 7:
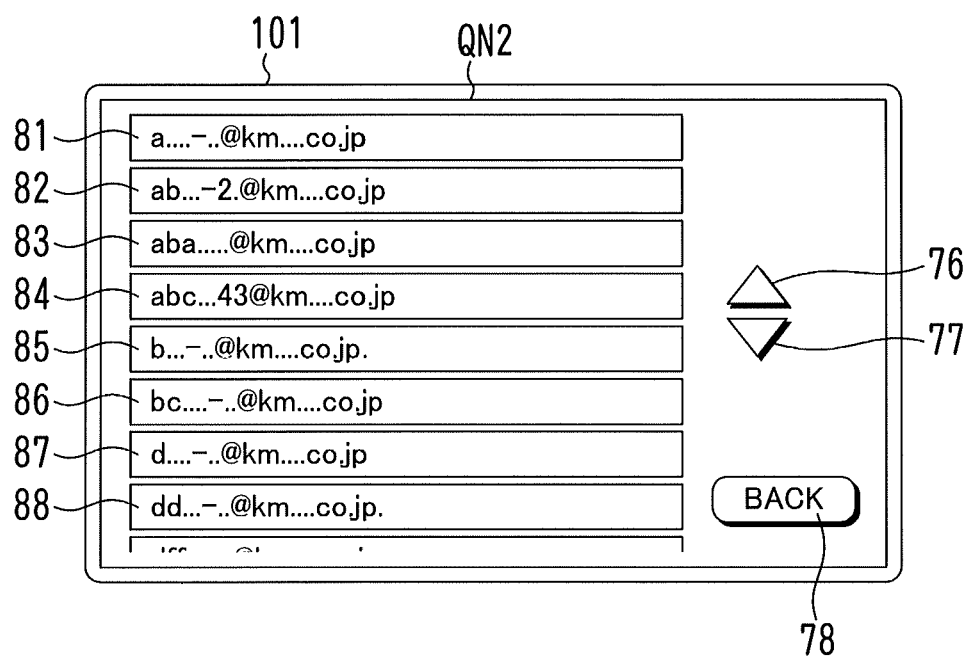
FIG. 7 is a diagram showing an example of a text selection screen for text entry into a text entry box.

Referring to FIG. 7, the illustrated text selection screen QN2 has choice buttons 81, 82, 83, 84, 85, 86, 87, and 88 corresponding to a plurality of sets of predetermined text (in this example, electronic mail addresses) that are candidates for being entered into the text entry boxes, shift buttons 76 and 77 for changing options of predetermined text to be displayed, and an entry stop button 78 for changing the current indication on the touchscreen 101 to the indication of the text type selection screen QN1. Each of the choice buttons 81 through 88 indicates predetermined text that is dealt with as an option. Stated differently, the indicated predetermined text itself functions as a choice button. When the user presses one of the choice buttons 81 through 88, the corresponding predetermined text is conveyed to the Web browser 201, so that the corresponding predetermined text is entered into a text entry box of the Web page.

Figure 8:
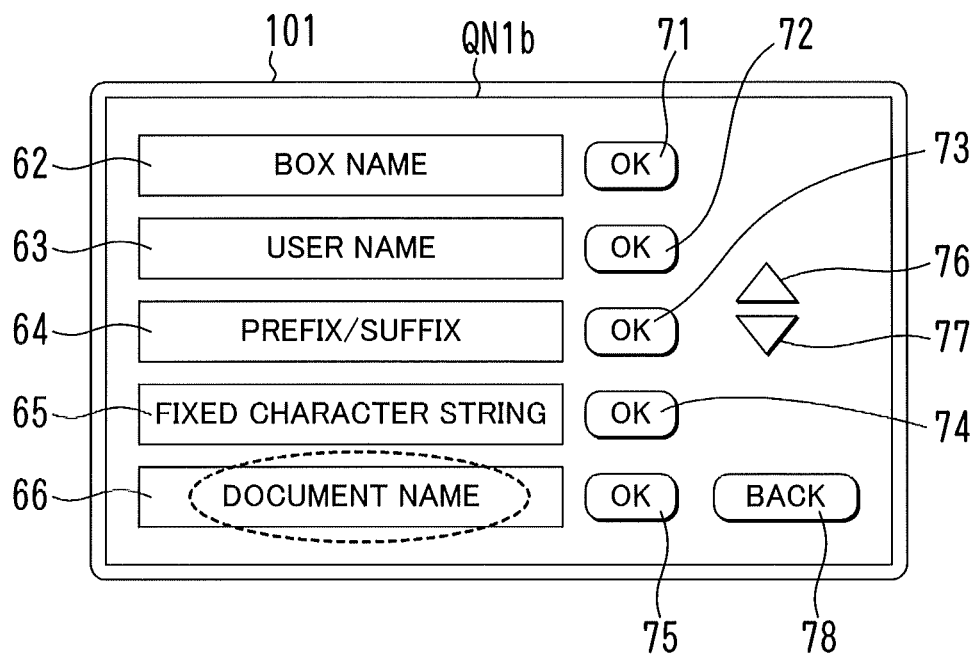
FIG. 8 shows an example of switching between options on a text type selection screen.

Referring back to FIG. 6, when the user presses the shift button 77, for example, a text type selection screen QN1b as shown in FIG. 8 is displayed instead of the text type selection screen QN1. As is clear from the comparison between FIG. 6 and FIG. 8, the text type selection screen QN1b of FIG. 8 has options 62 through 66 in lieu of the options 61 through 65 in the text type selection screen QN1 of FIG. 6. The other display details are the same between FIG. 6 and FIG. 8.

Assume that, in order to select, from among the options 62 through 66 arranged vertically in the text type selection screen QN1b of FIG. 8, the option 66 ("document name") which is provided at the bottom and where an ellipse is drawn by a dashed line, the user presses the choice button 75 corresponding to the option 66. Further, assume that, for example, a non-illustrated text selection screen for the user to select one of a plurality of sets of predetermined text whose type is "document name" is displayed, and the user selects one set of predetermined text on the text selection screen. In short, assume that the user enters predetermined text whose type is "document name" into a text entry box of a Web page. By doing so, the recording portion 205 makes a record of such text entry operation as the history data DL, and the details of such text entry operation are reflected in indication on a screen in the subsequent text entry.

Figure 9:
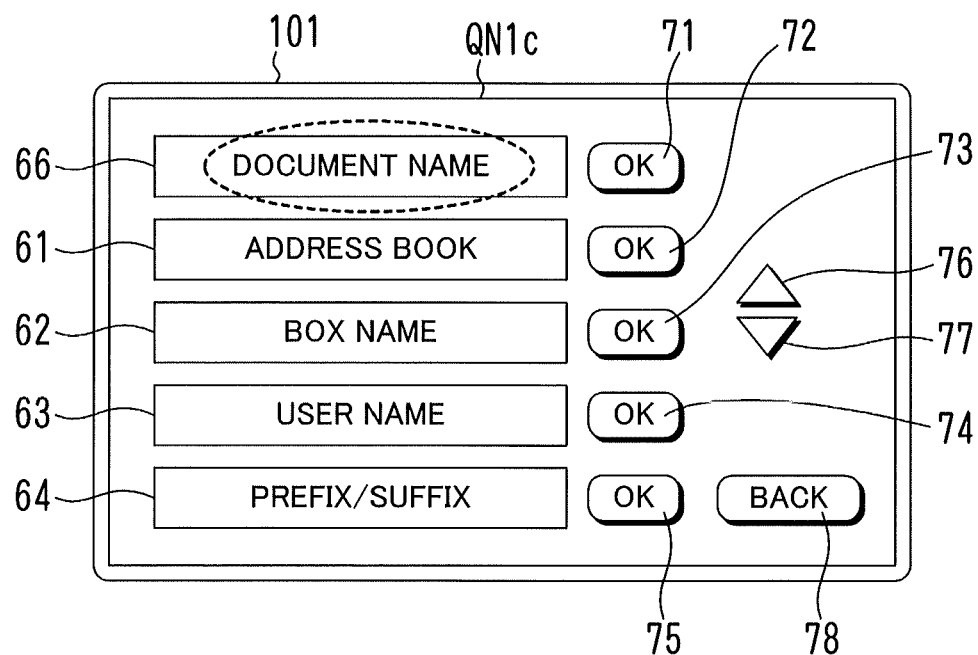
FIG. 9 shows an example of switching between the positions of options on a text type selection screen.

FIG. 9 shows an example of indication on a screen into which the details of the prior text entry operation are incorporated. As described above, assume that the predetermined text whose type is "document name" has already been entered. When the user attempts to enter text again into the text entry box that is the same as that of the Web page QB1 shown in FIG. 5, not the text type selection screen QN1 of FIG. 6 but a text type selection screen QN1c of FIG. 9 that is a modified version thereof is displayed. The text type selection screen QN1c has options 66, 61, 62, 63, and 64. As is understood from the comparison between FIG. 6 and FIG. 9, the text type selection screen QN1c of FIG. 9 has the option 66 ("document name") that is not contained in the text type selection screen QN1 of FIG. 6, and further, the option 66 is displayed at the top of the other options 61 through 64. The option 65 ("fixed character string"), which is displayed at the bottom of the text type selection screen QN1 of FIG. 6, is not displayed on the text type selection screen QN1c of FIG. 9. Stated differently, the text type selection screen QN1c of FIG. 9 is displayed in such a manner that predetermined text whose type is "document name" takes precedence over predetermined text of the other types. This enables the user to select the predetermined text whose type is "document name" more easily than the other sets of predetermined text.

[Text Entry-Related Operation in MFP]

Figure 10:
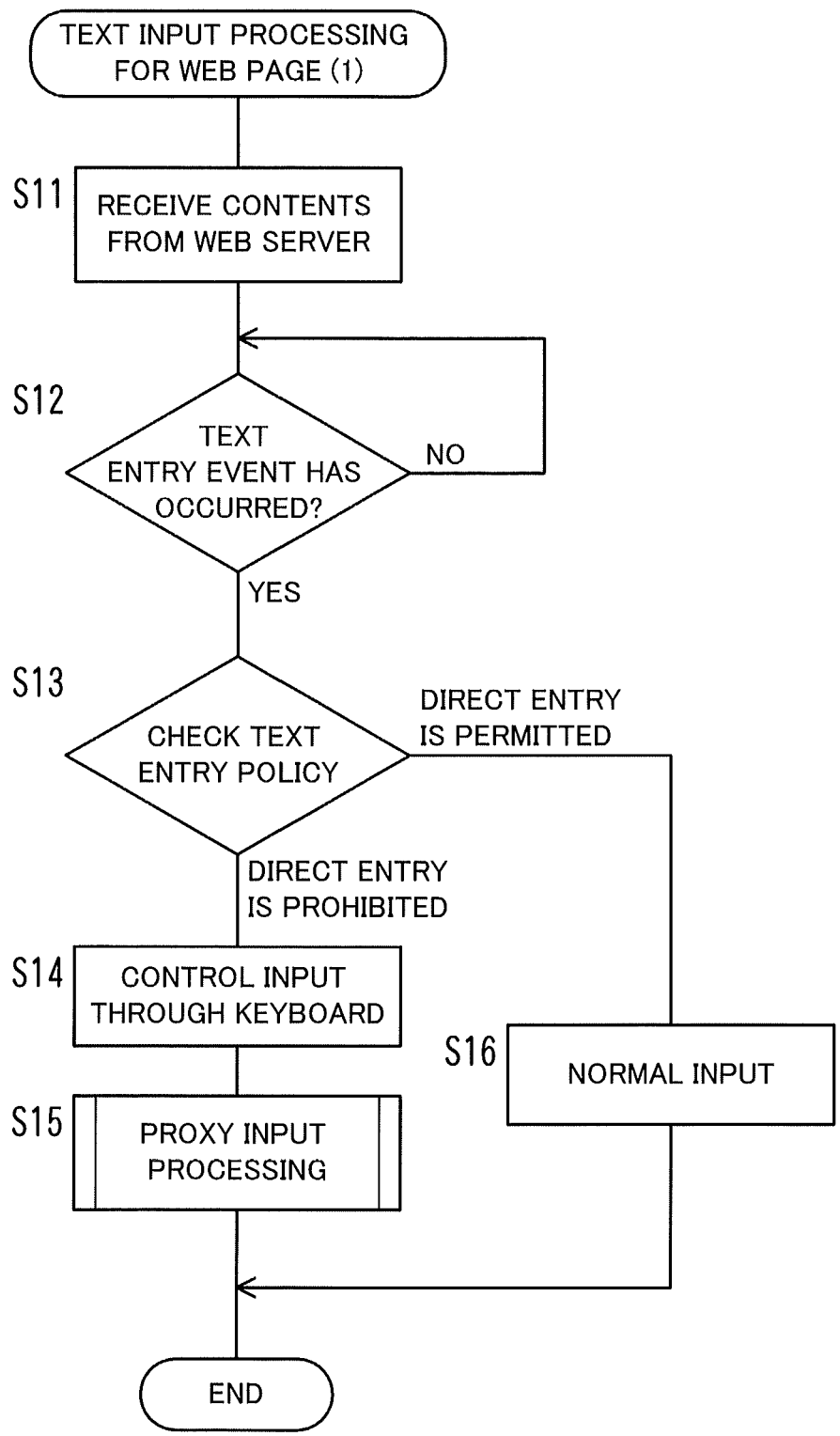
FIG. 10 is a flowchart depicting a first example of the flow of text input processing for a Web page.

FIG. 10 is a flowchart depicting a first example of the flow of text input processing for a Web page. The Web browser 201 receives Web page data (contents) from a Web server, and displays a Web page QB1 (Step S11). When an event that a user attempts to enter text into a text entry box occurs (Yes in Step S12), the text entry limiting portion 202 checks a text entry policy applied to the MFP 1 (Step S13). If the MFP 1 is not placed in a mode where direct text entry is prohibited, then the text entry limiting portion 202 does not limit text entry. In such a case, the Web browser 201 performs normal input processing by which a predetermined entry environment is provided to the user so that any text entry by the user is accepted (Step S16). On the other hand, if the MFP 1 is put in a mode where direct text entry is prohibited, then the text entry limiting portion 202 limits text entry by the user to entry of only predetermined text as discussed above (Step S14). The MFP 1 then performs proxy input processing for the user to enter predetermined text (Step S15).

Figure 11:
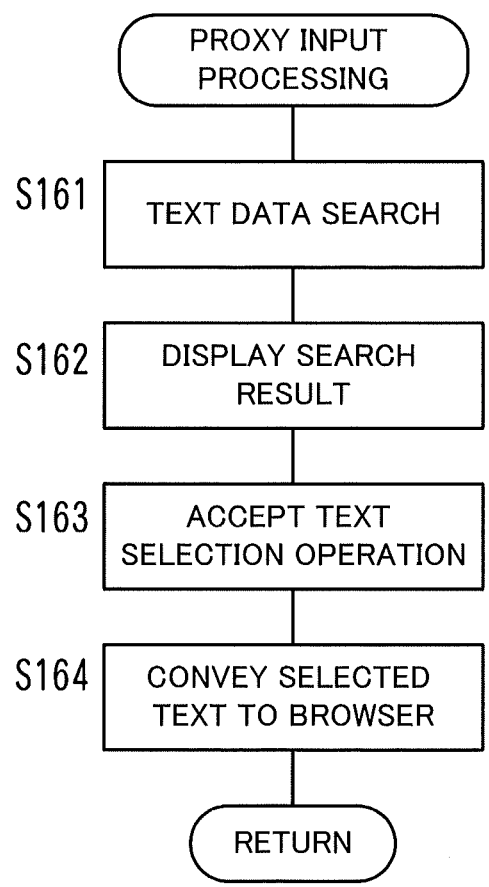
FIG. 11 is a flowchart depicting an example of proxy input processing that is a part of text input processing.

FIG. 11 is a flowchart depicting an example of the proxy input processing. The display processing portion 203 searches for data stored in the MFP 1, and extracts predetermined text (Step S161). The display processing portion 203 then presents the extracted predetermined text to the user (Step S162). To be specific, the display processing portion 203 displays the text type selection screens QN1, QN1b, and QN1c, and the text selection screen QN2 appropriately so that the user can designate text to be entered. Then, the operation processing portion 204 accepts operation performed on a screen displayed by the display processing portion 203 (Step S163), and informs the Web browser of predetermined text selected and designated by the user (S164).

Figure 12:
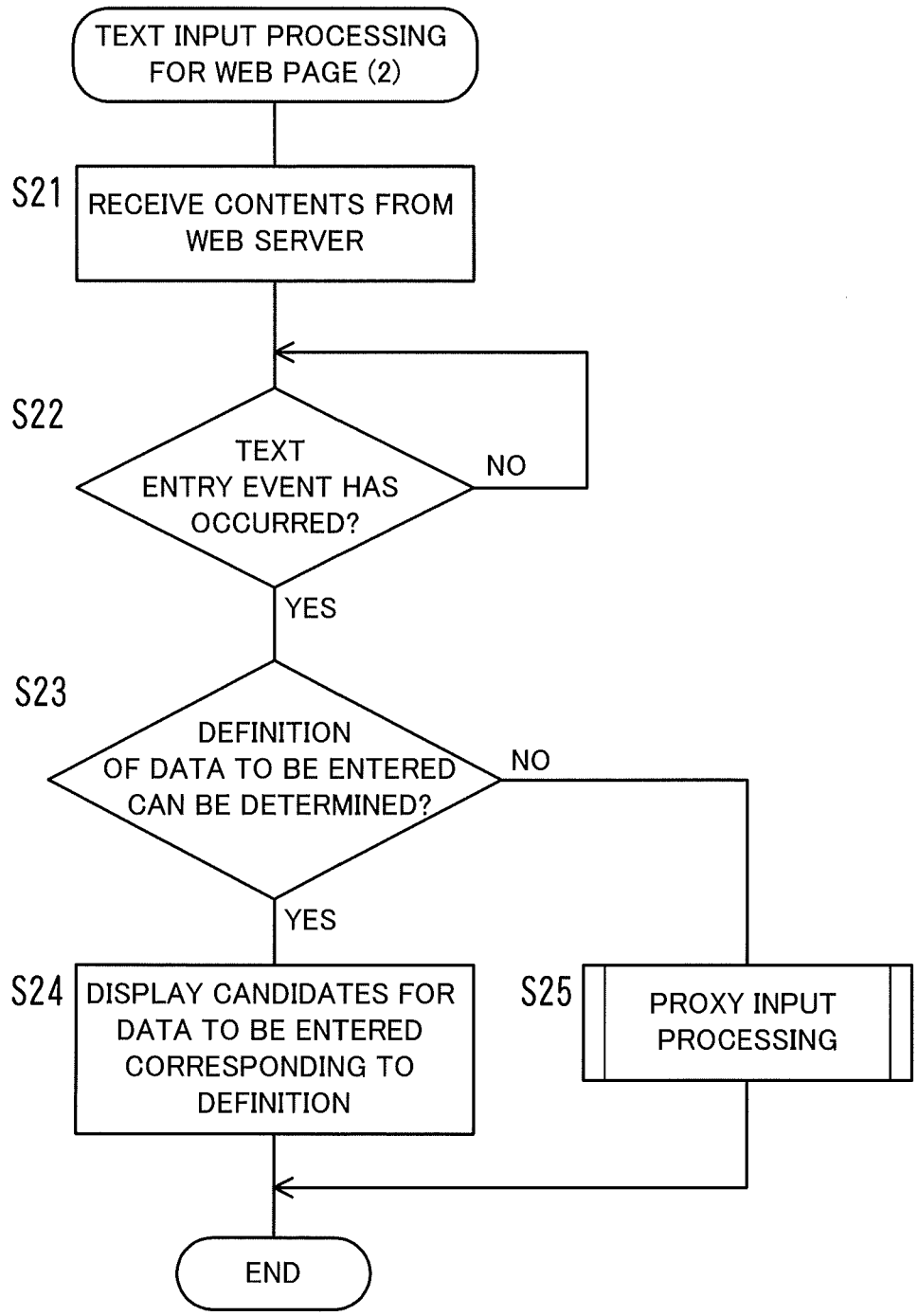
FIG. 12 is a flowchart depicting a second example of the flow of text input processing for a Web page.

FIG. 12 is a flowchart depicting a second example of the flow of text input processing for a Web page. The Web browser 201 receives Web page data (contents) from a Web server, and displays a Web page QB1 (Step S21). When an event that a user attempts to enter text into a text entry box occurs (Yes in Step S22), the text entry limiting portion 202 analyzes information about (definition of) a text entry box in the contents, and checks whether or not the type of text to be entered into the text entry box can be determined (Step S23). If the type of text to be entered cannot be determined (No in Step S23), then the MFP 1 performs proxy input processing (Step 25). How to perform the proxy input processing is the same as the details of the proxy input processing in FIG. 11. On the other hand, if the type of text to be entered can be determined (Yes in Step S23), then the MFP 1 performs processing of Step S24. In Step S24, if the type of text to be entered determined based on the contents is included in types of predetermined text predefined as a target of extraction by the display processing portion 203, then the text entry limiting portion 202 limits text entry by the user to entry of only predetermined text. The display processing portion 203 displays an operation screen for presenting, to the user, as input candidates, only predetermined text classified into the type of text to be entered.

According to the present invention, text that is a character or character string to be entered into a text entry box of a Web page is limited to predetermined text stored in advance in the image forming apparatus. It is thus possible to prevent text from being entered incorrectly when entering any text is permitted. Further, since a screen for a user to select predetermined text is displayed, the usability is provided which saves the user from having to enter text in the text entry box.

In this embodiment, the descriptions are given above by taking the example in which a Web-based user interface is used for operation through the operating panel 10. Instead of this, however, it is possible to provide a mode where not Web-based user interface but conventional user interface is used. Alternatively, it is also possible to use the Web-based user interface and the conventional user interface selectively depending on which function of the MFP 1 is used.

In the foregoing embodiment, the configuration of the MFP 1 can be modified appropriately. For example, in an operating screen displayed by the display processing portion 203, predetermined text serving as input candidates may be displayed in alphabetical order. Existing technologies for enhancing operability can be used in the embodiment. Such technologies are, for example, hierarchical screens, animation, and universal design. No limitations are imposed on screen layout as long as the screen layout complies with the specifications of a display.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus including an operating panel capable of providing a screen display and a Web browser, the image forming apparatus comprising:
a storage portion configured to store predetermined text that is data to be entered into a text entry box of a Web page;
a text entry limiting portion configured to, when the Web page displayed on the operating panel by the Web browser contains the text entry box, limit text to be entered into the text entry box to the predetermined text stored in the storage portion;
a display processing portion configured to, when the text entry limiting portion limits text to be entered, display a first selection screen and a second selection screen on the operating panel, wherein the first selection screen shows options of types of the predetermined text which are candidates for being entered into the text entry box, and the second selection screen being for a user to designate, as text to be entered into the text entry box, the predetermined text corresponding to a type selected from among the types on the first selection screen;
an operation processing portion configured to inform the Web browser of the predetermined text designated by the user on the second selection screen; and
a recording portion configured to make a record of a history that identifies the Web page and indicates a type of the predetermined text designated by the user,
wherein when the Web page to be displayed by the Web browser is a Web page which is displayed before and whose history is already recorded, the display processing portion displays the first selection screen in such a manner that the type of the predetermined text indicated in the history takes precedence over other types.

2. The image forming apparatus according to claim 1, wherein
the display processing portion extracts a plurality of sets of the predetermined text from data held in the image forming apparatus, and displays the plurality of sets of the predetermined text extracted on the second selection screen.

3. The image forming apparatus according to claim 2, wherein the display processing portion excludes the predetermined text whose type is set by an administrator of the image forming apparatus from the plurality of sets of the predetermined text to be extracted.

4. The image forming apparatus according to claim 1, wherein the text entry limiting portion limits text to be entered by stopping changing indication on the operating panel by the Web browser to an operating screen for the user to enter text.

5. The image forming apparatus according to claim 1, wherein
when data indicating the Web page displayed by the Web browser contains a text entry box and information indicating a type of text to be entered into the text entry box, and further, when the predetermined text corresponds to the information, the text entry limiting portion limits text to be entered into the text entry box to the predetermined text, and
the display processing portion displays the second selection screen for the user to select text to be entered from among the plurality of sets of the predetermined text corresponding to the information.

6. A non-transitory computer-readable storage medium storing thereon a computer program executed in an image forming apparatus that includes an operating panel capable of providing a screen display and a Web browser, the computer program causing a computer provided in the image forming apparatus to implement:
text entry limiting processing for, when a Web page displayed on the operating panel by the Web browser contains a text entry box, limiting text to be entered into the text entry box to predetermined text held in the image forming apparatus;
display processing for, when text to be entered is limited in the text entry limiting processing, displaying a first selection screen and a second selection screen on the operating panel, wherein the first selection screen shows options of types of the predetermined text which are candidates for being entered into the text entry box, and the second selection screen being for a user to designate, as text to be entered into the text entry box, the predetermined text corresponding to a type selected from among the types on the first selection screen;

operation processing for informing the Web browser of the predetermined text designated by the user on the second selection screen; and recording processing for making a record of a history that identifies the Web page and indicates a type of the predetermined text designated by the user, wherein when the Web page to be displayed by the Web browser is a Web page which is displayed before and whose history is already recorded, the display processing displays the first selection screen in such a manner that the type of the predetermined text indicated in the history takes precedence over other types.

* * * * *